US006432517B1

(12) United States Patent
Yokota et al.

(10) Patent No.: US 6,432,517 B1
(45) Date of Patent: Aug. 13, 2002

(54) RECORDING SHEET AND PROCESS FOR PRODUCING IT

(75) Inventors: Nobuyuki Yokota, Yokohama; Shunji Hayashi, Shizuoka; Masaki Kageyama, Shizuoka; Natsuko Tomioka, Shizuoka, all of (JP)

(73) Assignees: Asahi Glass Company Ltd., Tokyo; Tokushu Paper Mfg. Co., Sunto-gun, both of (JP)

( * ) Notice: Subject to any disclaimer, the term of this patent is extended or adjusted under 35 U.S.C. 154(b) by 0 days.

(21) Appl. No.: 09/443,350

(22) Filed: Nov. 19, 1999

(30) Foreign Application Priority Data

Nov. 21, 1998 (JP) .......................................... 10-347874
Jun. 22, 1999 (JP) .......................................... 11-176093

(51) Int. Cl.[7] ............................ B32B 27/14; B32B 3/00
(52) U.S. Cl. ....................................... 428/195; 428/211
(58) Field of Search ................................ 428/211, 195, 428/212, 219, 304, 329, 331, 532, 688

(56) References Cited

U.S. PATENT DOCUMENTS 4,794,044 A * 12/1988 Arai et al. .................. 427/431
5,279,885 A * 1/1994 Ohmori et al. ............. 428/195
5,320,897 A 6/1994 Kondo et al.
5,472,773 A * 12/1995 Misuda et al.
5,484,683 A * 1/1996 Tsukahara et al. .......... 430/203
5,541,002 A * 7/1996 Hosoi et al. ............. 428/537.5
5,605,750 A 2/1997 Romano et al.
5,691,046 A * 11/1997 Matsubara et al.
5,985,076 A * 11/1999 Misuda et al.
6,245,422 B1 * 6/2001 Onishi et al. ............... 428/331

FOREIGN PATENT DOCUMENTS

EP 0 622 244 11/1994
EP 0 737 591 10/1996
GB 2 210 812 6/1989

* cited by examiner

*Primary Examiner*—Bruce H. Hess
*Assistant Examiner*—B. Shewareged
(74) *Attorney, Agent, or Firm*—Oblon, Spivak, McClelland, Maier & Neustadt, P.C.

(57) ABSTRACT

A recording sheet which comprises a substrate and a porous layer containing alumina or an alumina hydrate formed on the substrate, wherein the substrate is made of fibers for paper and a filler, and the content of the filler in the substrate is from 10 to 60 wt % to the total weight of the substrate.

20 Claims, No Drawings

RECORDING SHEET AND PROCESS FOR PRODUCING IT

The present invention relates to a recording sheet, particularly a recording sheet for an ink jet printer which presents a clear color, and a process for producing it.

An ink jet recording system has been widely used in recent years in the field of a color copying machine or hard copy from e.g. computers and videotapes, since full coloring is easy, and printing speed can be made high. In such a field, the following are required: (1) a high resolution, (2) an excellent color reproducibility (adequately secured color tone), (3) capability of high speed printing, and (4) excellent preservation properties, etc.

To achieve these, improvements have been made in both printers and recording materials. As the conditions of the recording materials to be satisfied may, for example, be such that (1) it exhibits a high color density of each ink dot, (2) it quickly absorbs inks, (3) ink dots are moderately spread thereon, (4) it exhibits a practically adequate freshness, and (5) it adequately absorbs inks and is free from wrinkles to be generated at the printed portion, particularly at the printed portion with a large amount of inks (hereinafter referred to as cockling).

Conventionally, as such a recording material, one comprising a paper sheet, and porous particles of silica, alumina or an alumina hydrate and a binder such as a polyvinyl alcohol, coated on the surface of the paper sheet, has been known.

However, the above recording material has such defects that when silica is coated thereon, although the ink will be quickly absorbed thereon, the ink will infiltrate from the surface into the deeper part, whereby the color density will be low, and further, the ink dots tend to be small, whereby the color density of the entire printed product tends to be low. Further, the cocklings can hardly be avoidable. To overcome such defects, attempts have been made such as increasing the coating amount, or making the ink-absorbent layer have a multi-layer structure. However, although the degree of cocklings will decrease, the ink will infiltrate into the deeper part, whereby the color density will not be adequate. Further, the cost will increase.

On the other hand, when the ink-absorbent layer is formed by coating a porous material containing alumina or an alumina hydrate, although the ink is quickly absorbed and a high color density can be obtained as compared with silica, the cocklings can hardly be avoidable. To overcome such defects, an attempt to increase the coating amount has been made. However, although the degree of cocklings can be suppressed, the defects can not essentially be solved. Further, the cost will increase. Further, as disclosed in Japanese Patent No. 2,605,585, an attempt has been proposed to provide a silica porous layer as an underlayer of the porous layer containing alumina or an alumina hydrate, with a defect such as increase in steps.

Under these circumstances, the present inventors have conducted extensive studies to overcome the above problems, and they have found that by providing alumina or an alumina hydrate on a certain specific substrate as an ink-receiving layer, inks are quickly absorbed, and the inks are present at the surface, whereby a high color density can be obtained, and by increasing the content of a filler in the substrate, an excessive amount of moisture can be absorbed, whereby cocklings can be prevented, and the present invention has been accomplished.

Namely, it is an object of the present invention to provide a recording sheet which has a high ink absorption rate with a small amount of ink-receiving layer, which has an adequate color density, which is free from cockling, and which presents a clear image, and a process for producing it.

The present invention provides a recording sheet which comprises a substrate and a porous layer containing alumina or an alumina hydrate formed on the substrate, wherein the substrate is made of fibers for paper and a filler, and the content of the filler in the substrate is from 10 to 60 wt % to the total weight of the substrate.

The present invention further provides the recording sheet, wherein the substrate contains a microfibrillated cellulose in an amount of from 1 to 50 wt % to the total weight of the fibers for paper and the microfibrillated cellulose. The present invention further provides the recording sheet, wherein the substrate further contains a crystalline cellulose in an amount of from 1 to 50 wt % to the total weight of the fibers for paper, the microfibrillated cellulose and the crystalline cellulose. The present invention further provides the recording sheet, wherein the orientation ratio of the fibers of the substrate is from 1.0 to 2.0, and the coating amount of the porous layer on the substrate is at least the minimum coating amount as obtained from the following formula (1):

$$\text{minimum coating amount (g/m}^2\text{)} = 33.3\times\{(\text{orientation ratio of the fibers})-1\}+2 \tag{1}$$

Further, the present invention provides a process for producing a recording sheet comprising a substrate and a porous layer containing alumina or an alumina hydrate formed on the substrate, which comprises sheeting an aqueous slurry containing fibers for paper and a filler to form a substrate made of the fibers for paper and the filler, wherein the content of the filler in the substrate is brought to a level of from 10 to 60 wt % to the total weight of the substrate. The present invention further provides the process for producing a recording sheet, wherein the orientation ratio of the fibers of the substrate is from 1.0 to 2.0, and the coating amount of the porous layer on the substrate is at least the minimum coating amount as obtained from the above formula (1).

The content of the filler in the substrate of the present invention is preferably from 10 to 60 wt % to the total weight of the substrate. If the content of the filler is less than 10 wt %, the ink absorptivity tends to be poor, whereby cocklings will form. If the content of the filler exceeds 60 wt %, the paper strength tends to be low. As the filler to be used in the present invention, at least one of a metal oxide, a metal phosphate, a metal carbonate and a metal silicate may be optionally used.

The above-mentioned metal oxides include hydrated oxides. Particularly preferred is silica or alumina. As the alumina, an alumina hydrate is preferred, and aluminum oxide as anhydride may be used. As the silica, hydrate silicic acid which is so called white carbon, silica gel, silica-alumina composite gel or diatomaceous earth may, for example, be mentioned. As the aluminum oxide, specifically activated alumina, alumina gel or activated bauxite may, for example, be mentioned. As another metal oxide, titanium oxide, zirconium oxide or magnesium oxide may, for example, be mentioned.

The metal phosphate may, for example, be calcium phosphate (e.g. apatite such as apatite fluoride or hydroxyapatite, or calcium primary phosphate). The metal carbonate may, for example, be heavy calcium carbonate, light precipitated calcium carbonate or magnesium carbonate. The metal silicate may, for example, be magnesium silicate such as talc, sepiolite or Florisil, calcium silicate, aluminum silicate such as kaolin, activated clay or acid clay.

Among the above-mentioned fillers, silica is preferably used as it is excellent in ink absorptivity. A substrate having a filler content of from 10 to 60 wt % to the total weight of the substrate, can be obtained by sheeting an aqueous slurry containing a filler and fibers for paper.

The substrate to be used in the present invention is preferably made by a conventional method in such a manner that fibers for paper are adjusted to have a freeness of from 250 to 700 ml C.S.F. (Canadian Standard Freeness), a filler is added thereto, followed by sheeting by a known paper machine such as cylinder paper machine or Fourdrinier paper machine. Further, the orientation ratio of the fibers of the substrate is preferably from 1.0 to 2.0, and the coating amount of the porous material on the substrate is preferably at least the minimum coating amount as obtained from the above-mentioned formula (1), since cocklings are less likely to be formed. A substrate having an orientation ratio of the fibers of from 1.0 to 2.0, can be obtained by sheeting an aqueous slurry containing fibers for paper, as mentioned above. Further, within a range of not impairing the objects, at least one type of inorganic fibers such as glass fiber, rock wool, silica/alumina silicate fiber, alumina fiber, zirconia fiber or calcium titanate fiber, may optionally be used together.

The fibers for paper to be used in the present invention may, for example, be a wood pulp such as softwood unbleached kraft pulp (NUKP), softwood bleached kraft pulp (NBKP), hardwood unbleached kraft pulp (LUKP), hardwood bleached kraft pulp (LBKP), softwood sulfite pulp (NBSP) or thermomechanical pulp (TMP), a non-wooden pulp such as hemp, bamboo, straw, kenaf, paper mulberry, mitsumata (*Edgeworthia papyrifera*), unsized silk paper or cotton, a synthetic pulp such as polyolefin, or a synthetic fiber such as rayon, vinylon, nylon or polyester. They may be used alone or as a mixture.

In the present invention, in addition to the fibers for paper, a microfibrillated cellulose may be used. The microfibrillated cellulose is a cellulose having its fibers branched by physicochemical beating effect. By using this, the paper strength will be further strengthened, a higher color density and freshness can be obtained, and it is also effective to prevent cocklings. In such a case, the content of the microfibrillated cellulose is preferably from 1 to 50 wt % to the total weight of the fibers for paper and the microfibrillated cellulose. If the content of the microfibrillated cellulose is less than 1 wt %, the effects are less likely to be obtained. On the other hand, if the content exceeds 50 wt %, water filtration property will deteriorate, whereby sheeting property will be poor.

The microfibrillated cellulose to be used in the recent invention may be one having an arithmetic average fiber length of from 0.1 to 0.5 mm, a fiber width of at most about 1 $\mu$m, a water retention value of from 250 to 500%. The arithmetic average fiber length is represented by the value obtained by integrating the total length of fibers present in a certain amount of pulp suspension as measured by a fiber length distribution measuring machine manufactured by KAYAANI (Finland), and dividing the total length by the number of fibers. The water retention value is based on "Water Retention Testing Method for Pulp" by Japan Tappi (Technical Association of the Pulp and Paper Industry), No. 26.

As the method for producing the microfibrillated cellulose to be used in the present invention, a method of utilizing mechanical shear force, may, for example, be employed, such as a method of using a beating machine such as a beater, a conical refiner, a single disk refiner or a double disk refiner, a method of letting the fiber material pass through an orifice with a small diameter under a high pressure, a method of applying impulse to the fiber material by rotating an impeller by a driving shaft equipped with pebble as described in JP-A-63-256787, or a method of using a fine pulverizer such as a sand mill as described in JP-A-4-194097.

The material for the microfibrillated cellulose may be a chemical pulp such as softwood bleached kraft pulp (NBKP), hardwood bleached kraft pulp (LBKP) or softwood sulfite pulp (NBSP), a mechanical pulp such as ground wood pulp (GP) or thermomechanical pulp (TMP), a nonwooden pulp such as a bast fiber pulp including paper mulberry, unsized silk paper and mitsumata (*Edgeworthia papyrifera*), cotton pulp or hemp, or a regenerated cellulose fiber. Further, a synthetic fiber such as alamide fiber may be used, as the case requires.

In the present invention, a crystalline cellulose may further be used. The crystalline cellulose is effective to prevent cocklings, as it has no water-swelling characteristics. In such a case, the content of the crystalline cellulose is preferably from 1 to 50 wt % to the total weight of the fibers for paper, the microfibrillated cellulose and the crystalline cellulose. If the content of the crystalline cellulose is less than 1 wt %, the effects are less likely to be obtained. On the other hand, if it exceeds 50 wt %, the paper strength tends to be poor.

The crystalline cellulose powder to be used in the present invention is preferably one having a degree of polymerization of at most 1,000, and is one having a cellulose obtained from e.g. a wooden pulp, a non-wooden pulp or a regenerated cellulose, treated to remove the non-crystallized portion. The crystalline cellulose is classified into various grades, based on the treatment mode of the cellulose obtained from the starting material, the content of the non-crystallized portion, the degree of polymerization and the like. The crystalline cellulose to be used in the present invention is not particularly limited, and is produced by a known method (e.g. Japanese Journal of Paper Technology, Akira Yamaguchi, vol. 28, No. 9, pages 5–11 (August, 1985)).

For sheeting the substrate of the present invention, a primer, a yield-improving agent, a dry-strength agent, a wet-strength agent, a binder, a dispersing agent, a flocculation agent, a plasticizer or an adhesive may be optionally used, as the case requires, within a range of not impairing desired performances. The substrate of the present invention is preferably sheeted to have a basis weight of 200 g/m$^2$, by using e.g. a cylinder paper machine, a Fourdrinier paper machine, an inclined paper machine or a twin wire paper machine.

Further, size pressing may be carried out as the case requires. In such a case, at least one of boric acid, a borate and a paper surface-treating agent may optionally be used. Particularly when size pressing is carried out by using at least one of boric acid and a borate together with a paper surface-treating agent, even when a porous layer containing a large amount of alumina or an alumina hydrate is provided thereon, or even when a polyvinyl alcohol is used as the binder, no crack will form on the porous layer.

The boric acid may, for example, be orthoboric acid, metaboric acid or hypoboric acid. The borate is preferably a water-soluble salt of such a boric acid. It may, for example, be $Na_2B_4O_7.H_2O$, $NaBO_2.4H_2O$, $K_2B_4O_7.5H_2O$, $KBO_2$, $NH_4B_4O_9.3H_2O$ or $NH_4BO_2$. Particularly preferred is sodium tetraborate (borax), as an aqueous solution having a high concentration can be obtained. The amount of borax is preferably from 0.3 to 3 g/$m^2$ as calculated as boric acid ($H_3BO_3$), in view of prevention of cracks.

The paper surface-treating agent to be used in the present invention is a substance which improves properties of a paper sheet when coated on the surface of the paper sheet, and it includes a surface paper strength agent, a surface sizing agent and a gloss-forming agent. The surface paper strength agent may, for example, be a water-soluble high polymer such as starch or its modified product, polyacrylamide or polyvinyl alcohol. The surface sizing agent may, for example, be a styrene-acrylic type emulsion. The gloss-forming agent may, for example, be a synthetic resin emulsion, a wax emulsion or a polyolefin emulsion. At least one of these may be optionally used.

The obtained substrate may be subjected to a smoothing treatment such as supercalender treatment. By the smoothing treatment, the density, smoothness and glossiness of the recording sheet will improve, and such performances can be newly imparted. On the substrate thus sheeted, a layer of alumina or an alumina hydrate is provided. Such a layer is preferably formed by mixing alumina or an alumina hydrate with an optional binder, followed by coating on the substrate. Particularly preferably a sol of pseudo boehmite is prepared, said sol is coated with a suitable thickness on the substrate, followed by gelation.

The alumina or the alumina hydrate to be used in the present invention preferably has a dye adsorptivity of from 20 to 100 mg/g. If the dye adsorptivity does not satisfy the lower limit, no adequate color development and resolution will be obtainable, and if it exceeds the upper limit, effects of having such a high adsorptivity will not be obtainable any more, and such is unfavorable in view of cost.

The dye adsorptivity is represented by the weight of a dye to be adsorbed in the substance per unit weight, and is defined as follows. 1 g of the substance to be measured in a powder form with an average powder diameter of 15 $\mu$m is put in 100 cc of water at room temperature, and an aqueous solution containing 2 wt % of a dye (Food Black 2) is dropwise added thereto at a rate of 1 cc/min. with stirring. Firstly the dye is adsorbed in the powder, whereby the liquid will not color. However, when the amount of the dye added exceeds the dye adsorptivity of the powder, the liquid will color. The dye adsorptivity (mg/g) is obtained from the amount of dye to be added until the initiation of coloring of the liquid, as the amount of dye to be adsorbed in the powder.

The alumina or the alumina hydrate may be a porous aluminum oxide having a sum of volume of pores with radii of from 1 to 30 nm of from 0.2 to 2.0 cc/g, or its hydrate. As a method for measuring pore physical properties, the distribution of pores in the dry solid content of the alumina or the alumina hydrate can be measured by nitrogen adsorption method (constant flow method), for example, by using omnisoap 100 manufactured by Omicron Technology Co., Ltd. Further, more preferred is one having a sum of volume of pores with radii of from 3 to 10 nm of from 0.2 to 1.5 cc/g.

The alumina or the alumina hydrate may be crystalline or non-crystalline, and it may be in an optional shape of e.g. irregular particles or globular particles. A gel obtained by drying alumina sol is particularly preferred. As the binder, a polyvinyl alcohol or its modified product, starch or its modified product, casein, NR, SBR, NBR, an acrylic resin or a urethane resin may, for example, be used alone, or as a mixture or copolymer of two or more of them. As the case requires, a coating assistant such as a defoaming agent, a flowability control agent, a crosslinking agent, a water proofing agent or a preservative may be used.

The alumina or the alumina hydrate may be coated on both sides or one side of the substrate. For coating, a known coating apparatus such as air knife coater, gravure coater, blade coater, roll coater, gate roll coater or bar coater may optionally be used, and usually an amount of from 0.5 to 50 g/$m^2$ is coated per one side.

The above-mentioned recording sheet preferably has a porous layer containing silica particles formed between the substrate and the porous layer containing alumina or an alumina hydrate (hereinafter referred to as alumina-containing porous layer), since the surface of the porous layer containing silica particles which is in contact with said alumina-containing porous layer, tends to be smoothened, whereby color shading will be minimized, and image quality of a recording will improve, and besides, glossiness of the recording sheet will improve. It is more preferred to use borax together with silica particles, in view of prevention of cracks. As such silica particles, silica gel particles, silica/alumina gel particles, diatomaceous earth particles, fumed silica particles or white carbon particles may, for example, be used. The average particle size of the silica particles is more preferably from 0.2 to 10 $\mu$m, since the surface which is in contact with the above-mentioned alumina-containing porous layer tends to readily be smoothened. The porous layer containing silica particles preferably has such a constitution that the silica particles are bonded by a binder such as a polyvinyl alcohol. The amount of the binder is preferably such that the binder solid content to the silica particles is from 0.05 to 0.6. The porous layer containing silica particles has a silica particle content of preferably within a range of from 1 to 30 g/$m^2$. If the silica particle content is less than is 1 g/$m^2$, the surface which is in contact with said alumina-containing porous layer may not adequately be smoothened, and if the silica particle content exceeds 30 g/$m^2$, mechanical strength of the recording sheet will decrease.

As the method for forming the porous layer containing silica particles, coating may be mentioned, preferably by the above-mentioned coating method.

To the surface of the recording sheet thus produced, a surface treatment may further be applied. The surface treating agent to be used is a substance which improves characteristics of a paper sheet when coated on the surface of the paper sheet, and it includes a water proofing agent and a gloss forming agent. At least one of synthetic resin emulsion, wax emulsion, polyolefin emulsion and vanish may optionally be used. Further, the obtained substrate may be subjected to a smoothing treatment such as a supercalender treatment. By applying a smoothing treatment thereto, density, smoothness and glossiness of the recording sheet will further improve, and such performances can be newly imparted.

Now, the present invention will be explained in further detail with reference to Examples (Examples 1 to 10 and Examples 15 to 18) and Comparative Examples (Examples 11 to 14 and Examples 19 to 22). However, it should be understood that the present invention is by no means restricted to such specific Examples.

The physical properties were measured as follows.

Orientation ratio of the fibers: It was measured by means of ultrasonic wave by using SST-250 manufactured by Nomura Shoji Co., Ltd. Specifically, the time required for transmission of longitudinal ultrasonic wave pulse in a certain distance on a sheet-like sample, was measured, and the orientation ratio of the fibers of the substrate was obtained from transmission rates of ultrasonic wave in MD direction and CD direction, where MD direction was a direction in which the paper sheet flowed during sheeting, and the CD direction is a direction perpendicular thereto, i.e. a width direction of the paper sheet. In this case, the orientation ratio of the fibers is represented by the ratio of the transmission rate of ultrasonic wave in MD direction, to the transmission rate of ultrasonic wave in CD direction.

Color density: Solid printing with magenta and cyan was carried out by using an ink jet printer PM-700C manufactured by Seiko Epson Co., Ltd., and the color density was measured by a reflection densitometer SPM100 manufactured by GRETAG.

Ink absorption rate: By means of PM-700 manufactured by Seiko Epson Co., Ltd., patterns were printed with blue (cyan and magenta) having concentrations varied every 10% from 0 to 100%, whereupon visual observation was carried out and the ink absorption rate was represented by % of the highest concentration of the ink which was completely absorbed just after printing.

Cockling: It was measured by a method wherein a solid pattern of 5 cm×5 cm was printed by using PM-700 manufactured by Seiko Epson Co., Ltd. with blue (cyan and magenta), and visually evaluated into four grades of excellent, good, fair and failure, or by a method wherein solid printings of 100% and 200% were carried out by using printers BJC-420J manufactured by Cannon Inc. (super photo mode) and PM-750C manufactured by Seiko Epson Co., Ltd. (glossy paper mode), and evaluation into five grades (the greater the number, the better the characteristics) was carried out.

Glossiness: Glossinesses of 60° and 85° were measured by a gloss meter 300A manufactured by Nippon Denshoku Kogyo.

EXAMPLE 1

To a pulp slurry containing 80 wt % of NBKP adjusted to have a freeness of 400 ml C.S.F., 20 wt % of a silica gel ("Tokusil GU-N" manufactured by Tokuyama Corp., specific surface area: 150–220 $m^2/g$) as a filler and aluminum sulfate as a primer were added. A substrate having a basis weight of 157 $g/m^2$ was sheeted in accordance with a conventional method by using a Fourdrinier paper machine. The substrate had a silica gel content of 16 wt %. A mixture comprising 10 parts by weight of an alumina sol ("Cataroid AS-3" manufactured by Shokubai Kasei) having a solid content concentration of 7 wt % and containing boehmite as sol particles, and 1 part by weight of a polyvinyl alcohol ("PVA117" manufactured by Kuraray Co., Ltd.), was coated on one side of the substrate with an amount of 8 $g/m^2$ by a bar coater, to obtain a recording sheet. In the present specification, the amount of each component in a coating mixture is expressed on solid matter basis.

EXAMPLE 2

To a pulp slurry containing 70 wt % of NBKP adjusted to have a freeness of 400 ml C.S.F., 10 wt % of a microfibrillated cellulose adjusted to have a number average fiber length of 0.15 mm by mechanical means (by a homogenizer), was added. Stirring was carried out for 10 minutes after the addition, and then 20 wt % of a silica gel ("Tokusil GU-N" manufactured by Tokuyama Corp.) as a filler, and aluminum sulfate as a primer, were added thereto. A substrate having a basis weight of 157 $g/m^2$ was sheeted in accordance with a conventional method by using a Fourdrinier paper machine. The substrate had a silica gel content of 18 wt %. A mixture comprising 10 parts by weight of an alumina sol ("Cataroid AS-3" manufactured by Shokubai Kasei) having a solid content concentration of 7 wt %, and 1 part by weight of a polyvinyl alcohol ("PVA117" manufactured by Kuraray Co., Ltd.), was coated on one side of the substrate with an amount of 8 $g/m^2$, by a bar coater, to obtain a recording sheet.

EXAMPLE 3

A substrate was sheeted in the same manner as in Example 1 except that a porous silica ("MB-4B" manufactured by Fuji Silysia Chemical Ltd.) having a specific surface area of 500 $m^2/g$ was used instead of the silica gel as the filler for the substrate in Example 1. The substrate had a porous silica content of 18 wt %. A mixture comprising 10 parts by weight of an alumina sol ("Cataroid AS-3" manufactured by Shokubai Kasei) having a solid content concentration of 7 wt % and 1 part by weight of a polyvinyl alcohol ("PVA117" manufactured by Kuraray Co., Ltd.) was coated on one side of the substrate with an amount of 8 $g/m^2$ by a bar coater, to obtain a recording sheet.

EXAMPLE 4

To a pulp slurry containing 25 wt % of NBKP adjusted to have a freeness of 400 ml C.S.F., 20 wt % of a microfibrillated cellulose adjusted to have a number average fiber length of 0.15 mm by mechanical means (by a homogenizer) was added. Stirring was carried out for 10 minutes after the addition, and then 55 wt % of a silica gel ("Tokusil GU-N" manufactured by Tokuyama Corp.) as a filler, and aluminum sulfate as a primer, were added thereto. A substrate having a basis weight of 157 $g/m^2$ was sheeted in accordance with a conventional method by using a cylinder paper machine. The substrate had a silica gel content of 48 wt %. A mixture comprising 10 parts by weight of an alumina sol ("Cataroid AS-3" manufactured by Shokubai Kasei) having a solid content concentration of 7 wt %, and 1 part by weight of a polyvinyl alcohol ("PVA117" manufactured by Kuraray Co., Ltd.), was coated on one side of the substrate with an amount of 8 $g/m^2$ by a bar coater, to obtain a recording sheet.

EXAMPLE 5

To a pulp slurry containing 60 wt % of NBKP adjusted to have a freeness of 400 ml C.S.F., 10 wt % of a microfibrillated cellulose adjusted to have a number average fiber length of 0.15 mm by mechanical means (by a homogenizer), and 10 wt % of a crystalline cellulose ("Abicell" manufactured by Merck Japan Limited), were added. Stirring was carried out for 10 minutes after the addition, and then 20 wt % of a silica gel ("Tokusil GU-N" manufactured by Tokuyama Corp.) as a filler, and aluminum sulfate as a primer, were added thereto. A substrate having a basis weight of 157 $g/m^2$ was sheeted in accordance with a conventional method by using a Fourdrinier paper machine. The substrate had a silica gel content of 17 wt %. A mixture comprising 10 parts by weight of an alumina sol ("Cataroid AS-3" manufactured by Shokubai Kasei) having a solid content concentration of 7%, and 1 part by weight of a polyvinyl alcohol ("PVA117" manufactured by Kuraray Co., Ltd.), was coated on one side of the substrate with an amount of 8 $g/m^2$ by a bar coater, to obtain a recording sheet.

EXAMPLE 6

To a pulp slurry containing 60 wt % of NBKP and 20 wt % of polyethylene pulp, adjusted to have a freeness of 400 ml C.S.F., 20 wt % of a silica gel ("Tokusil GU-N" manufactured by Tokuyama Corp.) as a filler, and aluminum sulfate as a primer, were added. A substrate having a basis weight of 157 $g/m^2$ was sheeted in accordance with a conventional method by using a Fourdrinier paper machine. The substrate had a silica gel content of 16 wt %. A mixture comprising 10 parts by weight of an alumina sol ("Cataroid AS-3" manufactured by Shokubai Kasei) having a solid content concentration of 7 wt %, and 1 part by weight of a polyvinyl alcohol ("PVA117" manufactured by Kuraray Co., Ltd.), was coated on one side of the substrate with an amount of 8 $g/m^2$ by a bar coater, to obtain a recording sheet.

EXAMPLE 7

Size pressing was applied to the substrate of Example 1, by using a borax ($NA_2B_4O_7.10H_2O$) solution with an amount of 1.2 $g/m^2$ calculated as $H_3BO_3$. Then, size pressing was further carried out by using, as a paper surface-treating agent, a liquid having oxidized starch and polyacrylamide mixed with a weight ratio of 1 to 3, with an amount of 1.2 $g/m^2$, to obtain a substrate. A mixture comprising 10 parts by weight of an alumina sol ("Cataroid AS-3" manufactured by Shokubai Kasei) having a solid content concentration of 7 wt %, and 1 part by weight of a polyvinyl alcohol ("PVA117" manufactured by Kuraray Co., Ltd.), was coated on one side of the substrate with an amount of 30 $g/m^2$ by a bar coater, to obtain a recording sheet.

EXAMPLE 8

The substrate of Example 1 was subjected to a supercalender treatment, and a mixture comprising 10 parts by weight of an alumina sol ("Cataroid AS-3" manufactured by Shokubai Kasei) having a solid content concentration of 7 wt %, and 1 part by weight of a polyvinyl alcohol ("PVA117" manufactured by Kuraray Co., Ltd.), was coated on one side of the substrate with an amount of 30 $g/m^2$ by a bar coater, to obtain a recording sheet.

EXAMPLE 9

The recording sheet obtained in Example 1 was subjected to a supercalender treatment, to obtain a recording sheet. The recording sheet has an improved glossiness as compared with Example 1.

EXAMPLE 10

On one side of the substrate of Example 7, a mixture comprising 10 parts by weight of a silica gel ("FINESIL X-37" manufactured by Tokuyama Co., Ltd.) having a solid content concentration of 8 wt % and 4 parts by weight of a polyvinyl alcohol ("PVA117" manufactured by Kuraray Co., Ltd.), was coated with an amount of 4 $g/m^2$ by a bar coater. And a mixture comprising 10 parts by weight of an alumina sol ("Cataroid AS-3" manufactured by Shokubai Kasei) having a solid content concentration of 7 wt %, containing boehmite as sol particles, and 1 part by weight of a polyvinyl alcohol ("PVA117" manufactured by Kuraray Co., Ltd.), was coated on the porous layer containing silica gel with an amount of 7 $g/m^2$ by a bar coater, to obtain a recording sheet.

EXAMPLE 11

To a pulp slurry containing 95 wt % of NBKP adjusted to have a freeness of 400 ml C.S.F., 5 wt % of a silica gel ("Tokusil GU-N" manufactured by Tokuyama Corp.) as a filler was added, and aluminum sulfate as a primer was added. A substrate having a basis weight of 157 $g/m^2$ was sheeted in accordance with a conventional method by using a Fourdrinier paper machine. The substrate had a silica gel content of 4 wt %. A mixture comprising 10 parts by weight of an alumina sol ("Cataroid AS-3" manufactured by Shokubai Kasei) having a solid content concentration of 7 wt %, and 1 part by weight of a polyvinyl alcohol ("PVA117" manufactured by Kuraray Co., Ltd.), was coated on one side of the substrate with an amount of 8 $g/m^2$ by a bar coater, to obtain a recording sheet.

EXAMPLE 12

To a pulp slurry containing 85 wt % of NBKP adjusted to have a freeness of 400 ml C.S.F., 10 wt % of a microfibrillated cellulose adjusted to have a number average fiber length of 0.15 mm by mechanical means (by a homogenizer) was added. Stirring was carried out for 10 minutes after the addition, and then 5 wt % of a silica gel ("Tokusil GU-N" manufactured by Tokuyama Corp.) as a filler was added thereto, and aluminum sulfate as a primer was added thereto. A substrate having a basis weight of 157 $g/m^2$ was sheeted in accordance with a conventional method by using a cylinder paper machine. The substrate had a silica gel content of 4 wt %. A mixture comprising 10 parts by weight of an alumina sol ("Cataroid AS-3" manufactured by Shokubai Kasei) having a solid content concentration of 7 wt %, and 1 part by weight of a polyvinyl alcohol ("PVA117" manufactured by Kuraray Co., Ltd.), was coated on one side of the substrate with an amount of 8 $g/m^2$ by a bar coater, to obtain a recording sheet.

EXAMPLE 13

On one side of the substrate of Example 1, a mixture comprising 10 parts by weight of an alumina sol ("Cataroid AS-3" manufactured by Shokubai Kasei) having a solid content concentration of 7 wt %, and 1 part by weight of a polyvinyl alcohol ("PVA117" manufactured by Kuraray Co., Ltd.), was double-coated by a bar coater to obtain a recording sheet having a coating amount of 30 $g/m^2$.

EXAMPLE 14

A substrate was sheeted in the same manner as in Example 1 except that kaolin ("UW-90" manufactured by Engelhard Asia Pacific Inc.) was used instead of the silica gel as the filler for the substrate in Example 1. The substrate had a kaolin content of 17 wt %. A mixture comprising 10 parts by weight of an alumina sol ("Cataroid AS-3" manufactured by Shokubai Kasei) having a solid content concentration of 7 wt %, containing boehmite as sol particles, and 1 part by weight of a polyvinyl alcohol ("PVA117" manufactured by Kuraray Co., Ltd.), was coated on one side of the substrate with an amount of 8 $g/m^2$ by a bar coater, to obtain a recording sheet.

Measurement results in Examples 1 to 14 are shown in Table 1.

TABLE 1

| | Color density | | | Ink | | Glossiness | | |
|---|---|---|---|---|---|---|---|---|
| | | | Ma- | absorp- | | | | |
| | Black | Cyan | genta | tivity | Cockling | 60° | 85° | Cracks |
| Ex. 1 | 2.24 | 2.31 | 1.78 | 100 | Good | 5 | 13 | Nil |
| Ex. 2 | 2.25 | 2.34 | 1.77 | 100 | Good | 5 | 14 | Nil |
| Ex. 3 | 2.22 | 2.32 | 1.76 | 100 | Good | 6 | 14 | Nil |
| Ex. 4 | 2.30 | 2.36 | 1.80 | 100 | Excellent | 10 | 25 | Nil |
| Ex. 5 | 2.26 | 2.32 | 1.76 | 100 | Excellent | 6 | 15 | Nil |

TABLE 1-continued

| | Color density | | | Ink | | Glossiness | | |
|---|---|---|---|---|---|---|---|---|
| | Black | Cyan | Ma-genta | absorp-tivity | Cockling | 60° | 85° | Cracks |
| Ex. 6 | 2.22 | 2.29 | 1.74 | 100 | Excellent | 5 | 14 | Nil |
| Ex. 7 | 2.38 | 2.40 | 1.86 | 100 | Good | 20 | 40 | Nil |
| Ex. 8 | 2.36 | 2.43 | 1.86 | 100 | Good | 6 | 15 | Nil |
| Ex. 9 | 2.42 | 2.44 | 1.88 | 100 | Good | 8 | 20 | Nil |
| Ex. 10 | 2.30 | 2.34 | 1.80 | 100 | Excellent | 14 | 35 | Nil |
| Ex. 11 | 2.00 | 2.09 | 1.63 | 50 | Failure | 3 | 8 | Nil |
| Ex. 12 | 2.05 | 2.11 | 1.67 | 60 | Failure | 3 | 8 | Nil |
| Ex. 13 | 2.39 | 2.40 | 1.79 | 100 | Failure | 15 | 35 | Present |
| Ex. 14 | 2.00 | 2.08 | 1.55 | 60 | Failure | 4 | 7 | Nil |

EXAMPLE 15

A recording sheet was obtained in the same manner as in Example 1 except that a synthetic alumina hydrate having a solid content concentration of 15 wt % was used instead of the alumina sol having a solid content concentration of 7 wt %, and the dry coating amount was changed from 8 $g/m^2$ to 22 $g/m^2$. The orientation ratio of the fibers of the substrate was 1.58.

EXAMPLE 16

A recording sheet was obtained in the same manner as in Example 2 except that a synthetic alumina hydrate having a solid content concentration of 15 wt % was used instead of the alumina sol having a solid content concentration of 7 wt %, and the dry coating amount was changed from 8 $g/m^2$ to 28 $g/m^2$. The orientation ratio of the fibers of the substrate was 1.65.

EXAMPLE 17

A substrate was sheeted in the same manner as in Example 15 except that a porous silica ("MB-4B" manufactured by Fuji Silysia Chemical Ltd.) having a specific surface area of 500 $m/g^2$ was used instead of the silica gel as the filler for the substrate in Example 15. The substrate had a porous silica content of 18 wt %, and the orientation ratio of the fibers was 1.1. Then, a recording sheet was obtained in the same manner as in Example 15 by coating the mixed liquid on the substrate by a bar coater with a dry coating amount of 5 $m^2/g$.

EXAMPLE 18

A recording sheet was obtained in the same manner as in Example 4 except that a synthetic alumina hydrate having a solid content concentration of 15 wt % was used instead of the alumina sol having a solid content concentration of 7 wt %, and the dry coating amount was changed from 8 $g/m^2$ to 35 $g/m^2$. The orientation ratio of the fibers of the substrate was 1.78.

EXAMPLE 19

A recording sheet was obtained in the same manner as in Example 15 except that the dry coating amount was changed to 15 $g/m^2$.

EXAMPLE 20

A recording sheet was obtained in the same manner as in Example 16 except that the dry coating amount was changed to 20 $g/m^2$.

EXAMPLE 21

A recording sheet was obtained in the same manner as in Example 18 except that the dry coating amount was changed to 15 $g/m^2$.

EXAMPLE 22

A substrate having a basis weight of 157 $g/m^2$ was sheeted in the same manner as in Example 15 except that a cylinder paper machine was used instead of the Fourdrinier paper machine. The substrate had a silica gel content of 16 wt %, and the orientation ratio of the fibers was 2.12. The same mixed liquid as in Example 15, containing the synthetic alumina hydrate and the polyvinyl alcohol, was coated on the substrate by a bar coater with a dry coating amount of 40 $g/m^2$, to obtain a recording sheet. The results in Examples 15 to 22 are shown in Table 2.

TABLE 2

| | Coating amount ($g/m^2$) | | Orientation | |
|---|---|---|---|---|
| | MIN value | Measured value | ratio of the fibers | Cockling |
| Ex. 15 | 21 | 22 | 1.58 | 5 |
| Ex. 16 | 24 | 28 | 1.65 | 5 |
| Ex. 17 | 5 | 5 | 1.1 | 5 |
| Ex. 18 | 28 | 35 | 1.78 | 5 |
| Ex. 19 | 21 | 15 | 1.58 | 4 |
| Ex. 20 | 24 | 20 | 1.65 | 3 |
| Ex. 21 | 28 | 15 | 1.78 | 2 |
| Ex. 22 | 39 | 40 | 2.12 | 4 |

From Examples and Comparative Examples, the following were found.

(1) As shown in Example 11, if the filler content in the substrate is less than 10 wt %, no effect of preventing cocklings can be obtained.

(2) As shown in Examples 1 to 10, when the filler content of the substrate is at least 10 wt %, an effect of preventing cocklings can be obtained.

(3) As evident from the comparison between Examples 2 and 4, a greater effect of preventing cocklings can be obtained with an increase in the filler content in the substrate.

(4) As evident from Example 5, a greater effect of preventing cocklings can be obtained when a crystalline cellulose is used for the substrate.

(5) As evident from Example 6, a greater effect of preventing cocklings can be obtained when a synthetic fiber is used for the substrate.

(6) As evident from the comparison between Examples 7 and 13 by observing the surfaces, when the coating amount on the surface layer is large, size pressing by borax on the substrate is effective to prevent cracks on the surface layer.

(7) As shown in Example 14, when kaolin is used for the substrate, no effect of preventing cocklings will be obtainable.

(8) As shown in Examples 15 to 18, all recording sheets having an orientation ratio of the fibers of the substrate of within a range of from 1.0 to 2.0, and having a coating amount of the porous layer on the substrate of at least the minimum coating amount as obtained from the above-mentioned formula (1), are rated as cockling evaluation 5, and have improved characteristics.

(9) As evident from Example 10, when a porous layer containing silica particles is formed between the substrate and the porous layer containing an alumina hydrate, glossiness will improve.

The recording sheet of the present invention has a high ink absorption rate with a small amount of ink-receiving layer, has an adequate color density, is free from cockling, and presents a clear image. Accordingly, a recording sheet particularly suitable for recording by an ink jet printer, can be provided.

What is claimed is:

1. A recording sheet which comprises a substrate and a porous layer containing alumina or an alumina hydrate formed on the substrate, wherein the substrate is made of fibers for paper and a filler, and the content of the filler in the substrate is from 10 to 60 wt % to the total weight of the substrate;

wherein the orientation ratio of the fibers for paper is from 1.0 to 2.0, and the coating amount of the porous layer on the substrate is at least the minimum coating amount as obtained from the following formula (1):

$$\text{minimum coating amount } (g/m^2) = 33.3 \times \{(\text{orientation ratio of the fibers}) - 1\} + 2 \quad (1).$$

2. The recording sheet according to claim 1, wherein the substrate contains a microfibrillated cellulose in an amount of from 1 to 50 wt % to the total weight of the fibers for paper and the microfibrillated cellulose.

3. The recording sheet according to claim 1, wherein the substrate further contains a crystalline cellulose in an amount of from 1 to 50 wt % to the total weight of the fibers for paper, the microfibrillated cellulose and the crystalline cellulose.

4. The recording sheet according to claim 1, wherein the filler is silica.

5. The recording sheet according to claim 1, wherein the substrate is subjected to a surface treatment by at least one member selected from the group consisting of boric acid, a borate and a surface treating agent.

6. The recording sheet according to claim 1, wherein the substrate is one subjected to a smoothing treatment.

7. The recording sheet according to claim 1, wherein a porous layer containing silica particles is formed between the substrate and the porous layer containing alumina or an alumina hydrate.

8. The recording sheet according to claim 1, wherein the porous layer containing alumina or an alumina hydrate is one subjected to a surface treatment by a surface treating agent.

9. The recording sheet according to claim 1, which is subjected to a smoothing treatment.

10. A process for producing a recording sheet according to claim 1, comprising:

sheeting an aqueous slurry containing fibers for paper and a filler to form a substrate made of the fibers for paper and the filler;

wherein a content of the filler in the substrate is brought to a level of from 10 to 60 wt %, to the total weight of the substrate.

11. A recording sheet which comprises a substrate and a porous layer containing alumina or an alumina hydrate formed on the substrate, wherein the substrate is made of fibers for paper and a filler, and the content of the filler in the substrate is from 10 to 60 wt % to the total weight of the substrate.

12. The recording sheet according to claim 11, wherein the filler is selected from the group consisting of a metal oxide, a metal phosphate, a metal carbonate and a metal silicate.

13. The recording sheet according to claim 11, wherein the filler is alumina or alumina hydrate.

14. The recording sheet according to claim 2, wherein the microfibrillated cellulose has an arithmetic average fiber length of from 0.1 to 0.5 mm, a fiber width of at most about 1 $\mu$m and a water retention value of from 250 to 500%.

15. The recording sheet according to claim 11, wherein said substrate is sheeted to have a basis weight of 200 $g/m^2$.

16. The recording sheet according to claim 11, wherein said alumina or said alumina hydrate has a dye adsorptivity of from 20 to 100 mg/g.

17. The recording sheet according to claim 11, wherein said alumina or said alumina hydrate is a porous aluminum oxide or its hydrate having a sum of volume of pores with radii of from 1 to 30 nm of from 0.2 to 2.0 cc/g.

18. The recording sheet according to claim 11, wherein said alumina or said alumina hydrate is coated on one side or on both sides of said substrate in an amount of from 0.5 to 50 $g/m^2$ per one side.

19. The recording sheet according to claim 7, wherein said porous layer containing silica particles has a silica particle content of from 1 to 30 $g/m^2$.

20. The recording sheet according to claim 19, wherein an average particle size of the silica particles is from 0.2 to 10 $\mu$m.

* * * * *